United States Patent [19]

Kafi

[11] Patent Number: 4,943,953
[45] Date of Patent: Jul. 24, 1990

[54] DEVICE FOR DRIVING RODENTS FROM SUBTERRANEAN BURROWS

[76] Inventor: Foroud Kafi, Felix-Dahn-Str.64, 1190 Vienna, Austria

[21] Appl. No.: 597,447

[22] Filed: Jun. 12, 1984

[30] Foreign Application Priority Data

Apr. 6, 1983 [AT] Austria .................................. 1212/83

[51] Int. Cl.⁵ .............................................. H04B 1/02
[52] U.S. Cl. .................................................. 367/139
[58] Field of Search ....................... 367/139; 116/22 A

[56] References Cited

U.S. PATENT DOCUMENTS 4,392,215  7/1983  Hall ..................................... 367/139

FOREIGN PATENT DOCUMENTS

042644A1  12/1981  European Pat. Off. .
2033812   1/1972   Fed. Rep. of Germany ...... 367/139
2352987A1 4/1975   Fed. Rep. of Germany .
2027573A  2/1980   United Kingdom .
2037135   7/1980   United Kingdom .

OTHER PUBLICATIONS

Webster's Ninth New Collegiate Dictionary, 1984, "Compressional Wave", Acoustic, Sound Wave, Shock Wave.

Primary Examiner—Thomas H. Tarcza
Assistant Examiner—David Cain
Attorney, Agent, or Firm—Herbert Dubno

[57] ABSTRACT

Rodents are driven off and kept away from burrows in a subterranean area by driving cylindrical housing containing respective shock wave generators into the ground. The shock wave generators are each designed to produce at timed intervals, damped vibrations which radiate into the surrounding ground.

9 Claims, 4 Drawing Sheets

DEVICE FOR DRIVING RODENTS FROM SUBTERRANEAN BURROWS

FIELD OF THE INVENTION

My present invention relates to a device for driving rodents and, especially, burrowing rodents such as field mice, voles, moles and groundhogs, woodchucks and the like, from their subterranean shelters or burrows.

BACKGROUND OF THE INVENTION

It is well known that certain burrowing rodents, and especially woodchucks, groundhogs, mice, voles and moles, are highly sensitive to shock waves, especially when these shock waves are transmitted through the ground to the animals in their burrows and that, when subjected to such shock waves, these animals tend to leave the burrows and hence are driven off from regions which are to be protected from them. This high physical sensitivity renders them particularly susceptible to the application of waves to the ground or soil which tend to surround the animals in their burrows, induce fright or fear and generate a flight syndrome.

It has been proposed heretofore, therefore, to drive off such rodents by the use of acoustic waves and hence to free an area subjected to such waves from these rodents. For this purpose, devices have been provided to apply acoustic waves of an appropriate amplitude or volume and these devices generally have transmitters, transducers or like output elements emitting the acoustic waves and which are intended to be inserted into the holes affording access to the burrows. The use of such devices, however, is disadvantageous, at least in part, because it requires the user to find the holes opening into the burrows to insert the device, a difficult operation.

OBJECTS OF THE INVENTION

It is the principal object of the present invention to provide an improved device for ridding a particular ground or area of burrowing rodents.

Another object of this invention is to overcome the disadvantages of earlier systems whereby acoustic waves have been utilized to drive burrowing rodents from their subterranean nesting sites.

SUMMARY OF THE INVENTION

I have now discovered that these objects can be attained with improved effect in the removal of rodents from a particular subterranean area utilizing a device which is formed with a casing adapted to be driven into the ground and provided with means for generating, rather than acoustic waves, damped vibrations within the ground which impinge from all directions upon the animal and thus are exceptionally effective in producing a sensation of terror which is manifested by rapid flight and a reluctance of the rodents to return. The damped vibration is imparted to the ground at shorter or longer intervals as may be convenient or desired.

According to the invention, the casing can have a relatively thin-wall body which can be driven into the ground to a predetermined depth and a vibration generator for the generation of damped vibration in the form of shocks, which vibrations are distributed substantially uniformly in all directions from the casing to the surrounding ground.

According to another feature of the invention the housing has the configuration of a cylinder at one end of which the generator for damped vibrations is provided and which includes an electric current source and, also in this cylindrical portion, electronic circuitry connected to this source and to the pulse generator for controlling the latter.

The latter end of the housing may be a rounded or pointed structure which can have a thicker wall.

According to yet another feature of the invention the pulse generator or the shock wave generator for producing the damped vibration comprises an electromagnet whose armature is in the configuration of a disc and, upon energization of an electromagnet coil, against the force of a weak spring strikes the stator of the magnet to generate the shock which is transmitted to the shell or casing of the housing to reduce the damped oscillation, radiating outwardly to the surrounding earth.

The current source is preferably a chargeable storage battery or accumulator and can be included in the casing so as to make the latter independent of some external current source and which is connected by appropriate conductors to the aforementioned circuitry at the magnets. The circuit of course can include a timer to establish the timing of the successive shock waves.

I have found, moreover, that it is advantageous to provide the magnet with a spiral spring establishing a spacing between the magnet core and the armature and the core can be relatively massive, i.e. an iron body to which the armature is attractable and against which the armature impacts.

The armature can be a plate provided on a central axially moving pin centrally connected by a screw arrangement with a mass and guided on a pin lodged in the end of the housing.

The coil arrangement for generating the impulse can be a coil of the type used in loudspeakers and which affords a considerable simplification of the structure.

The device of the invention allows cultivation protected against rodent infestations over the range area around the device. The effective range of the device can be 15 to 30 meters and consequently, corresponding devices can be spaced between 30 to 60 meters apart to ensure substantially complete freedom from rodent infestation of the cultivated plot.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
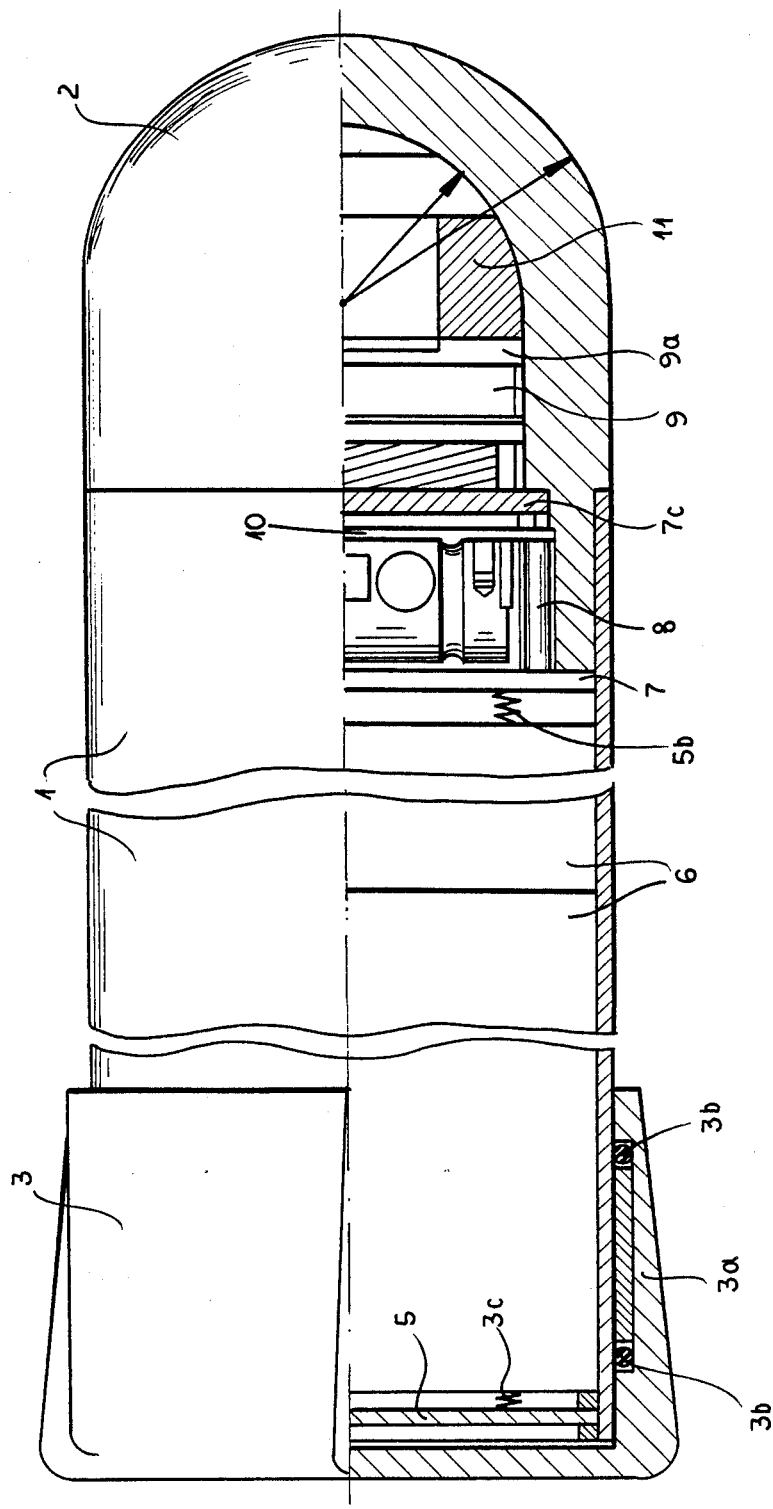
FIG. 1 is a partial longitudinal section through a device displaying the invention.

From FIG. 1 it will be apparent that the device of the invention can comprise a relatively elongated cylindrical housing 1 provided at an end 2 which is to be driven into the ground with a relatively thick-wall hemispherical tip while the remainder of the housing has a comparatively thin wall. The opposite end of the housing is provided at 3 with a removable cap.

The cap 3 is provided on its end and along its apron or parameter with ribs 3a offset by about 90° from one another about the periphery of the cap to enable the cap 3 to be more readily gripped and to facilitate threading of the cap onto an externally threaded portion of the housing 1. Sealing is effected between the wall of cylinder 1 and the interior of the cap by a pair of sealing rings represented at 3b.

The cap retains a pair of batteries 6 within the housing and these batteries can be resiliently supported by springs 3c while having a terminal bearing upon the contact plate 5 which can be supported by pins from the cap 3.

At the opposite end, the batteries can be supported by springs 5b. The batteries of course are electrically connected to the circuit represented in FIG. 4 at the terminals which have been illustrated.

A contact plate 7 supports the electronic circuit and support bolts 8 are provided to mount the contact plate and the printed circuit plate on a support 7c.

The armature or pulse-generating hammer 9 is shown to have the configuration of a disc which can be driven electromagnetically against the core of an electromagnet core in the compartment 9a and can be pressed away from the armature by a spring which has not been illustrated and which can be interposed between the armature and the magnet core. At 10 I have shown the electronic circuitry provided on the contact and circuit plates and representing the circuit shown in FIG. 4.

In operation of course, once the apparatus is assembled and turned on by inserting the batteries and turning on the switch, the assembly can be driven into the ground at locations between 30 and 60 meters apart and will automatically generate shock waves at preset times or with preset intervals in the form of damped vibrations. The damping is effected by the fact that only a single impulse is utilized to generate the short wave by impact of the armature against the electromagnet which is fixed to the casing.

Figure 2:
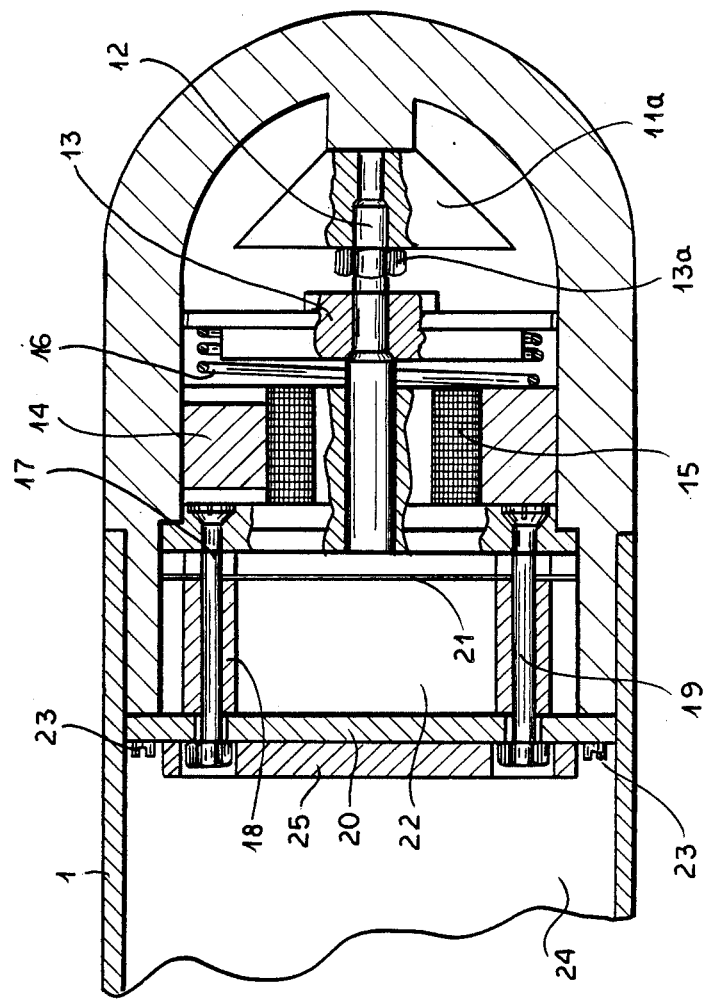
FIG. 2 is a fragmentary section through the shock-generating end of a device according to another embodiment of the invention.

In the embodiment of FIG. 2, a mass 11a is clamped or screwed onto a central pin 12 and is secured in place by a counternut. The pin 12 aligns this mass with an armature 13 or iron which can be drawn toward an electromagnet whose coil is shown at 15 to compress the spring 16. When the magnet is released, the iron mass 13 impacts upon the mass 11a.

At 17 I have shown a holding plate which is connected by spacer sleeves 18 and transmission bolts 19 with a fastening plate. A sheet 21 (printed circuit band) carries the electronic circuit elements which are received in the compartment 22. Terminals 23 are provided to contact the circuitry to the batteries in the compartment 24. A mounting plate has been shown at 25.

This device functions similarly to that described in FIG. 1, for example, the spring 16 can be sufficiently strong that it drives the armature 13 upon release by the electromagnet that it impacts against the mass 11 or can be relatively weak so that the impact is generated primarily by engagement of the mass 13 with the electromagnetic core. The mass 11a can be composed of lead. The armature can also be provided with or as a permanent magnet so poled with respect to the electromagnet that it is repelled against the mass 11a and the latter is driven against the housing.

In any of these casings a damped vibration will be established in the manner described.

Figure 3:
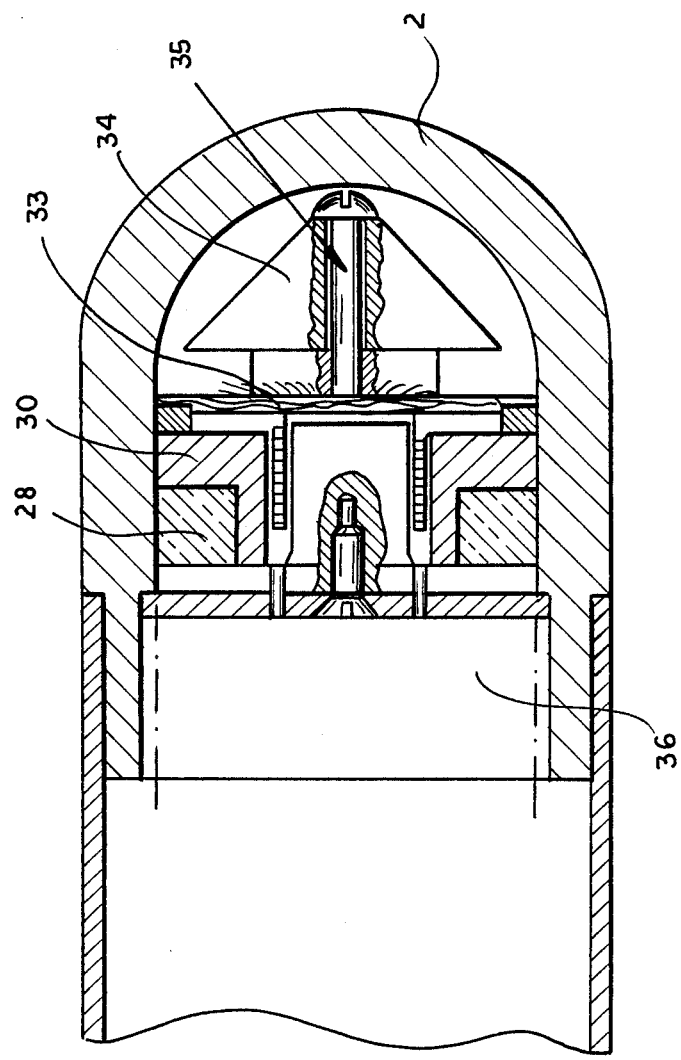
FIG. 3 is a view similar to FIG. 2 of still another such device.

In FIG. 3 the hemispherical end 2 of the housing receives a permanent magnet 28 in the form of a ring which is connected to an isolating body 30 defining a gap in which the excitation coil 31 is provided. The excitation coil 31 activates a membrane 33 which is connected with a lead mass 34 on a pin 35. The space 36 receives electronic circuit and the mass 34 can be driven by the loudspeaker-like vibration generating system against the hemispherical housing 2.

Figure 4:
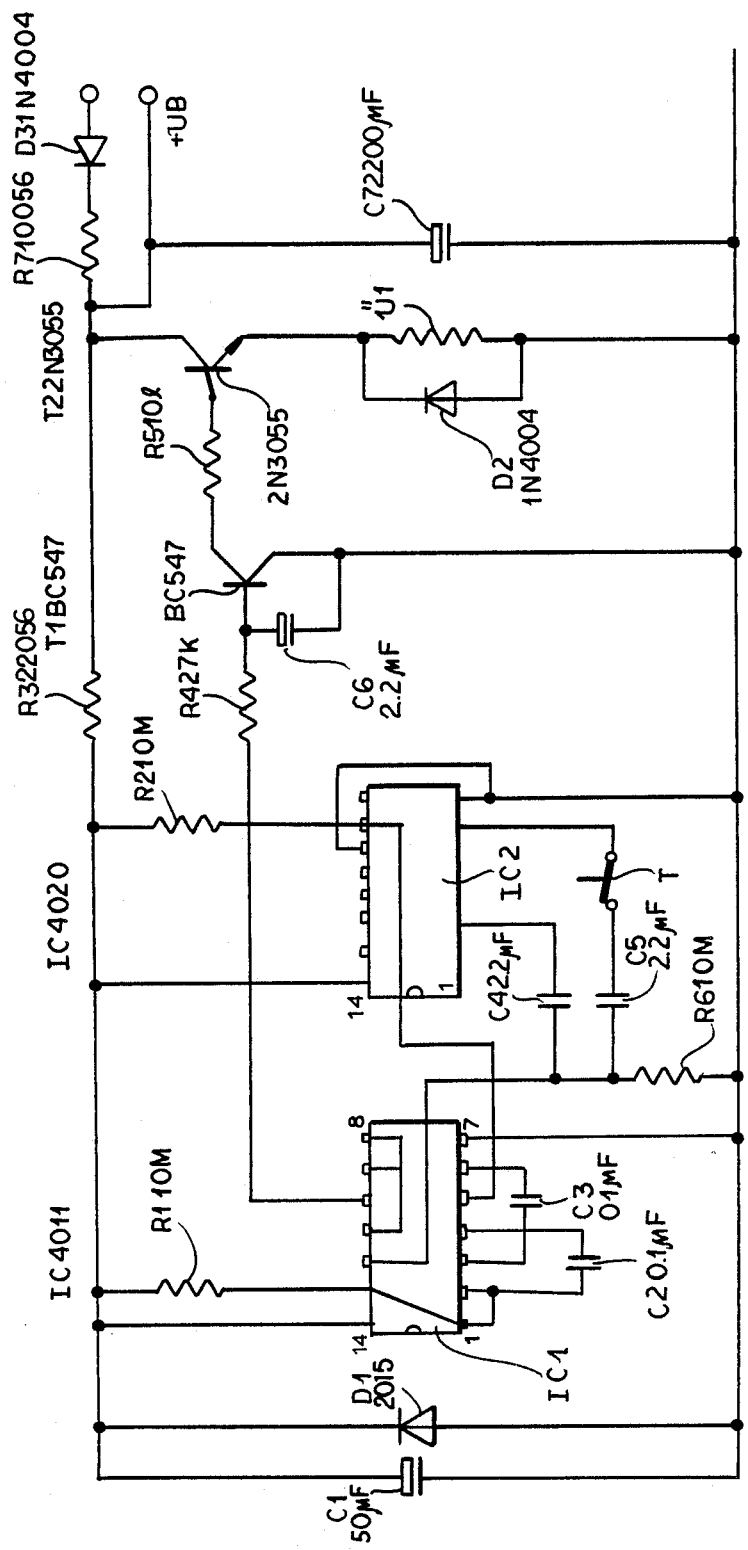
FIG. 4 is a circuit diagram of the electronic circuit for timing the generation of the shock waves generated by the device.

The circuit shown in FIG. 4 which I prefer to use employs an IC 1 of type 4011 constituting an oscillator with six terminals with the oscillation output being applied to a binary counter. The output of the IC 2 of type 4020 supplies oscillations of a large period. The IC 1, only the significant terminals of which have been shown to be connected, applies brief pulses to the transistor BC 547 which in turn controls the transistor 2N 3055 with the latter being rendered conductive to generate the coil energization for each shock. A switch not shown can be utilized to control the rate of succession of the pulses between rapid and slow, and a monitoring switch can be provided to trigger the circuit as a test. The condenser C 7 serves as the energy store which is discharged through the coil VI and elements R 3, C 1 and D 1, namely, a resistor, condenser and choke serve to protect the energy storage condenser and to improve the function.

Diode D 2 protects the transistor 2N 3055 from any adverse effect of the induction voltage of the coil. The condenser C-6 and resistor R 4 have a pulse-rounding function and tend to round off the rectangular pulse thereof to the control resistor BC 547. Naturally any conventional timing circuit can equally be used for the self-energization of the device.

I claim:

1. A device for driving rodents from burrows in a ground site which comprises:
    an elongated housing having at least a thin wall portion and a construction enabling said housing to be driven into the ground;
    a shock generator in said housing for generating nonaudible damped vibration compression waves at spaced-apart intervals and transmitting same to a wall of said housing;
    means for controlling said shock generator in said housing, said housing having the configuration of a cylinder and is provided with a shell at the end thereof adapted to be driven into the ground, said shock generator being provided in this shell at said end; and
    an electric current source in said housing connected to said shock generator.

2. The device defined in claim 1 wherein said shock generator includes an armature spring-biased in one direction and an electromagnet juxtaposed with said armature for activating same.

3. The device defined in claim 2 wherein said armature has the configuration of a disc.

4. The device defined in claim 2 wherein a coil spring acts upon said armature.

5. The device defined in claim 2 wherein said magnet is provided with a stator and said armature impacts thereagainst.

6. The device defined in claim 5 wherein said stator is an iron ring.

7. The device defined in claim 2, further comprising a mass in contact with said housing, said armature activating said mass.

8. The device defined in claim 7, further comprising a central guide pin extending from said mass and guiding said armature.

9. The device defined in claim 1 wherein said shock generator includes a permanent magnet, an excitation coil and a membrane forming the loudspeaker-type shock wave generator.

* * * * *